July 21, 1931.  A. C. EARHART  1,815,098
BOLT SUBSTITUTE
Filed Jan. 3, 1931
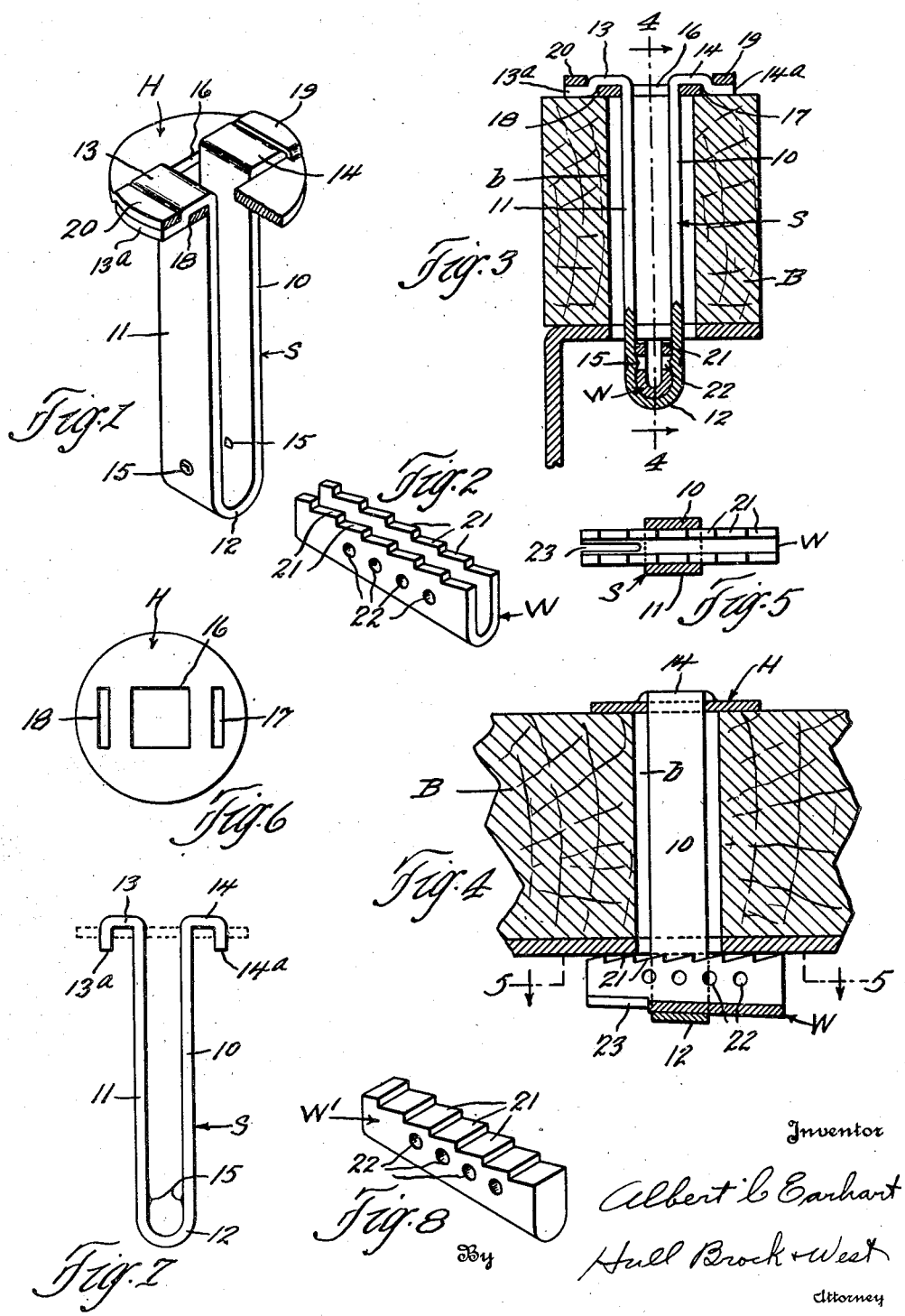

UNITED STATES PATENT OFFICE

ALBERT C. EARHART, OF SHAKER HEIGHTS, OHIO

BOLT SUBSTITUTE

Application filed January 3, 1931. Serial No. 506,377.

This invention relates to a bolt substitute designed to be used instead of the conventional screw-threaded bolt, nut and usual lock washer; and, referring to the particular embodiment disclosed, it is designed especially for connecting the sill of the body of a motor vehicle to the frame or chassis thereof.

As is well known in the art, the headed, screw-threaded bolt with its nut and lock washer, which is now generally used for the purpose of connecting vehicle bodies to frames, is a considerable problem in the manufacture and prevailing high speed assembly methods of modern practice, requiring, as it does, the hand operation of placing the lock washer and starting the nut, in addition to the step of tightening the nut, the latter usually being accomplished by the use of a mechanical device.

The principal object of my invention is to provide a bolt substitute which shall be inexpensive in construction and which can be inserted in position and tightened in a minimum time and at a minimum expense, requiring fewer hand operations and less expensive and more conveniently used tools for carrying out the tightening process. With the foregoing and other objects in view, as will be apparent from the following description, my invention consists in the details of construction and arrangements of parts as hereinafter described and in the combinations claimed.

Fig. 1 is a perspective view with parts broken away of the shank and head portions of my improved bolt substitute; Fig. 2 is a perspective of the wedge member which cooperates with the parts shown in Fig. 1; Fig. 3 is a sectional view showing said bolt substitute in position of use; Fig. 4 is a section on the line 4—4 of Fig. 6; Fig. 5 is a section on the line 5—5 of Fig. 4; Fig. 6 is a detail of an intermediate portion of the head plate H; Fig. 7 is an elevation of an intermediate form of the shank S and Fig. 8 is a perspective view of a modified form of the wedge member.

The particular embodiments of my invention, which will be used as illustrative, each consist of three parts: a narrow flat strip of sheet metal indicated generally by the reference character S, a head plate indicated by the reference character H, and a wedge locking member W.

The member S has a generally U-shaped shank portion comprised of the legs 10 and 11, a bight portion 12, and outwardly turned end or terminal portions 13 and 14. The portions 13 and 14 have their terminal extremities set down as at 13ª and 14ª. Slight inward extensions or dents 15 may be provided adjacent the bight 12 in each of the legs 10 and 11.

The head plate H may consist of a sheet metal plate provided with a comparatively large central opening 16 and narrow openings 17 and 18 in alignment at the two sides of the central opening 16. Adjacent the openings 17 and 18 the head plate will be bent upwardly, as indicated at 19 and 20 above the surface of the remainder of the plate H, whereby to accommodate the presence of the terminal portions 13ª and 14ª underneath.

The wedge W may consist of a stamping bent into U-shape and provided with teeth or serrations 21 and a series of openings 22 adapted to cooperate with the extensions 15 on the member S to provide locking engagement between the members S and W independent of any locking engagement between the teeth or serrations 21 and the members clamped between the head H and the wedge member W. It will be observed that one end of the wedge member W is slightly thicker than the other when bent into final position. A slot 23 may be provided in the smaller end of the member W and any tool, such as a screw driver, or a properly shaped part of a hammer, may be inserted therein to bend the two sides apart as a means of preventing complete removal or loss of the wedge member in case it should become loosened. Either the extensions 15 and openings 22, or the slot 23, or both, may be employed.

An alternative construction of the wedge member is shown at W'. In this modification, the wedge is not made of sheet metal but is formed or cast in a solid piece, having otherwise identical structure and functions with the member W.

In the manufacture of this embodiment of my invention an intermediate form of the member S is fashioned in the shape shown in Fig. 7 while the plate H is stamped in the form of a flat disk with the openings as shown in Fig. 6. The central opening 16 will have a width equal or substantially equal to the total section of the shank formed by the two spaced legs 10 and 11 of the member S, whereby the shank of the intermediate form of Fig. 7 may be inserted through the opening 16 and the projections 13ª and 14ª may enter the narrower slots 17 and 18. After the parts of Fig. 7 are thus associated, a pressing operation will serve to bend the members 13ª and 14ª and to form the bent portions 19 and 20.

When my improved bolt substitute is to be used for joining a sill member B of a motor vehicle with a frame member F thereof, the shank porton of the member S will be inserted through the opening $b$ in the sill and the opening $f$ in the frame member. The wedge W will then be inserted through the opening between the legs 10 and 11 and in engaging relation with the bight portion 12. The installation may then be completed by tightening the wedge W by a sharp blow of a hammer against the larger end thereof, and, if desired, by spreading the extremities of the smaller end thereof apart as hereinbefore described.

While I have shown and described in detail certain illustrative embodiments of my invention, I wish it understood that the same is limited only in accordance with definitions thereof in the appended claims and not to the details of the illustrations.

Having thus described my invention, what I claim is:

1. A bolt substitute including a U-shaped strap of sheet metal having out-turned end portions, and a head plate, said head plate having three openings therethrough, both legs of said U-shaped strap extending through one of said openings and one leg thereof extending through each of the other of said openings and underlying a portion of the head plate.

2. A bolt substitute including a U-shaped shank portion having out-turned end portions, and a head plate, said head plate having portions extending under said out-turned portions and portions extending over the same whereby to resist any tendency of said out-turned portions to straighten out.

3. A bolt substitute including a U-shaped shank portion having out-turned end portions, and a head plate, said out-turned portions having parts extending under said head plate and parts extending over the same whereby to resist any tendency of said out-turned portions to straighten out.

In testimony whereof, I hereunto affix my signature.

ALBERT C. EARHART.